United States Patent [19]
Brady

[11] Patent Number: 5,639,001
[45] Date of Patent: Jun. 17, 1997

[54] BICYCLE MOUNTED SURFBOARD RACK

[76] Inventor: William T. Brady, 1372 13th St., San Pedro, Calif. 90732

[21] Appl. No.: 568,263

[22] Filed: Dec. 6, 1995

[51] Int. Cl.$^6$ ............................................. B62J 11/00
[52] U.S. Cl. .................. 224/449; 224/416; 224/426; 224/445; 224/457; 224/458; 70/233; 70/226
[58] Field of Search ........................... 224/449, 416, 224/418, 445, 457, 458, 460, 426, 442, 551, 561, 560, 924; 70/233, 226; 248/316.8, 215, 201; 211/60.1, 70.5

[56] References Cited

U.S. PATENT DOCUMENTS

| | | | |
|---|---|---|---|
| 634,611 | 10/1899 | Butts | 224/445 |
| 672,540 | 4/1901 | Speir | 224/458 |
| 3,547,325 | 12/1970 | Hill | 224/457 |
| 3,659,761 | 5/1972 | Wesson | 224/457 |
| 4,393,986 | 7/1983 | Sirey | 224/457 |
| 4,792,072 | 12/1988 | Gibson | 224/445 |
| 4,928,863 | 5/1990 | Morgan | 224/457 |

*Primary Examiner*—Linda J. Sholl
*Attorney, Agent, or Firm*—Goldstein & Associates

[57] ABSTRACT

A surfboard rack, for allowing a surfboard to be carried with a bicycle, having a pair of hooks for engaging the frame of the bicycle near the front and rear, and an adjustable bar extending between the hooks. A pair of cradle assemblies are attached to the adjustable bar near the hooks. A pair of braces extend downward from the cradle assemblies to provide support against the bicycle frame. The adjustable bar may be varied in length to alter the distance between the front and rear hooks. Matched holes extend through the adjustable bar, which allow the distance between the hooks to be fixed and the adjustable bar locked, so that the surfboard rack can also function as a bicycle anti-theft device.

8 Claims, 5 Drawing Sheets

BICYCLE MOUNTED SURFBOARD RACK

BACKGROUND OF THE INVENTION

The invention relates to a bicycle mounted surfboard rack. More particularly, the invention relates to a surfboard rack that is easily attachable onto a bicycle frame for carrying a surfboard, and then may be easily detached from the bicycle when not in use.

While operating a two-wheeled vehicle, such as a bicycle, it is nearly impossible to carry any object in one's hands. That is because operating a two-wheeled vehicle is a two handed operation. It takes the strength and balance of two hands to effectively and safely maintain controlled motion for any length of time.

A surfboard is a particularly bulky item to carry. Even using a motor vehicle, it is difficult to transport. When a surfing enthusiast attempts to haul his surfboard by bicycle it is both a frustrating and dangerous endeavor. Most surfboards are longer than conventional two-wheeled vehicles and are relatively bulky, with the result that surfboards are very unwieldy and cumbersome to carry in this manner. When the surfer wraps his arm around the center of the surfboard in an effort to firmly grasp the surfboard while attempting to steer the vehicle with only one hand, the surfboard oscillates up and down as the surfer peddles the bicycle and the surfboard becomes unavoidably very difficult to hold. The surfer soon becomes weary from the physical strain of trying to both manually hold and transport the surfboard. This may result in impaired maneuverability and may be a significant contributing factor in causing an accident that otherwise could be avoided.

Further, wind currents, irregularities in the road surface, and sudden changes in velocity or direction of the bicycle are only some situations which cause the board to shift and exert forces that can overtake control of the bicycle. Even if the rider quickly dumps the board, the dangers still may not be averted. The board might instead become an obstacle or barrier, or project into the spokes, or control may be so far lost that it cannot be regained in time. Damage to the board and injury to the rider can frequently be expected.

Because of these risks and difficulties, transporting a surfboard by bicycle seems like an impossible task. However, others have sought to meet this challenge with a variety of conceptions, each involving complicated or permanent mounting to the bicycle.

U.S. Pat. No. 4,792,072 to Gibson teaches a rack for carrying a surfboard vertically at the rear of the vehicle. If the vehicle were to come to a stop suddenly, as in a crash, it appears likely that the board might come forward to strike the vehicle operator of the operator might fly back to strike the surfboard. Further, when driving the vehicle down a highway, the vertical orientation of the board would appear to adversely affect the stability of the vehicle, particularly when other vehicles such as trucks are passing. U.S. Pat. No. 4,928,863 to Morgan also discloses a bicycle rack which mounts a surfboard at the rear of a bicycle.

U.S. Pat. No. 3,547,325 to Hill discloses a surfboard carrying rack in which the surfboard is supported over the vehicle operator's head, parallel to the ground. With this arrangement, loading the surfboard onto the carrying rack becomes a problem in that one must attempt to place the surfboard at a high level on the rack without disturbing the balance of the vehicle. Loading the surfboard onto the rack can easily require two people: one person to hold the bicycle, and at least one more person to hoist the surfboard over their head onto the rack. Since the surfboard is at a high level, the effects of altering wind patterns caused by trucks or the like are amplified, adversely affecting the stability of the vehicle. Furthermore, since only two straps hold the surfboard to the rack, with a sudden stop as in an accident, the surfboard might come loose.

U.S. Pat. No. 3,659,761 to Wesson and U.S. Pat. No. 4,393,986 to Sirey both disclose surfboard carrying racks which mount a surfboard alongside a two-wheeled vehicle. Sirey involves a large cumbersome frame, and Wesson involves two components, each of which are permanently mounted to the bicycle.

While these units may be suitable for the particular purpose employed, or for general use, they would not be as suitable for the purposes of the present invention as disclosed hereafter.

SUMMARY OF THE INVENTION

It is an object of the invention to produce a surfboard rack that easily attaches onto the frame of a standard bicycle, to allow a surfboard to be safely carried alongside the bicycle while the bicycle is operated.

It is another object of the invention to provide a surfboard rack that is attachable or detachable at will. The surfboard rack has hooks that engage the bicycle frame at the front and rear of the bicycle, at the handlebars and seat support respectively. The hooks are attached to each other with an adjustable bar, the adjustable bar allowing the distance between the hooks to be easily altered so that the surfboard rack may be used on different size bicycles.

It is a further object of the invention that the relative distance of the hooks may be locked using a padlock or the like, and that the hooks are easily removable from the bicycle frame. Thus, the hooks may engage the wheels of the bicycle, and then the adjustable bar locked, so that the surfboard rack can function as a bicycle theft deterrent device.

It is a still further object of the invention to provide a surfboard rack which provides sufficient clearance between the surfboard and bicycle to allow the rider to operate the pedals of the bicycle.

The invention is a surfboard rack, for allowing a surfboard to be carried with a bicycle, having a pair of hooks for engaging the frame of the bicycle near the front and rear, and an adjustable bar extending between the hooks. A pair of cradle assemblies are attached to the adjustable bar near the hooks. A pair of braces extend downward from the cradle assemblies to provide support against the bicycle frame. The adjustable bar may be varied in length to alter the distance between the front and rear hooks. Matched holes extend through the adjustable bar, which allow the distance between the hooks to be fixed and the adjustable bar locked, so that the surfboard rack can also function as a bicycle anti-theft device.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 9 is a top plan view of the invention removed from the bicycle frame.

DETAILED DESCRIPTION OF THE PREFERRED EMBODIMENTS

Figure 1:
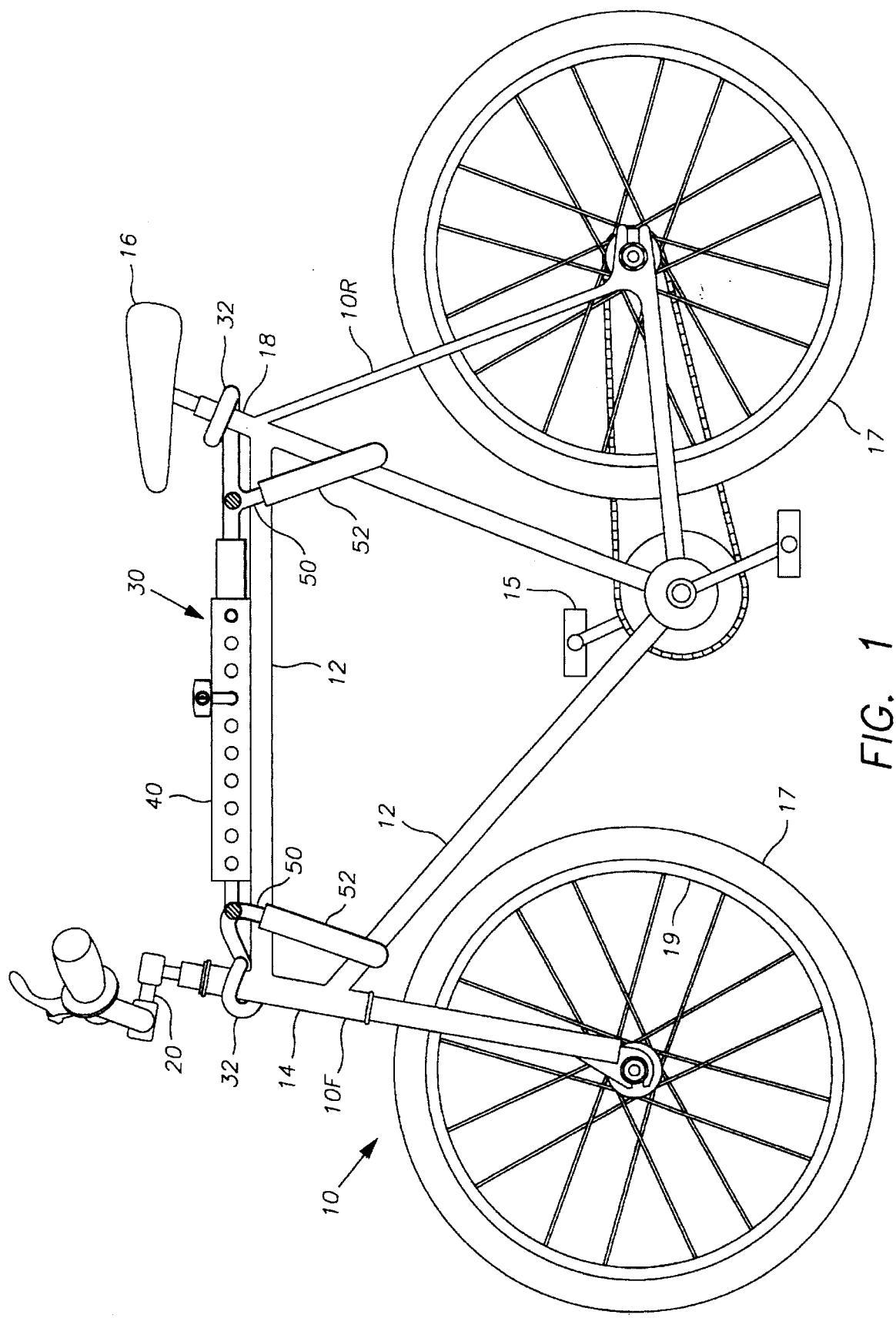
FIG. 1 is a front elevational view illustrating a bicycle with the invention installed thereon. A portion of the invention has been removed.

FIG. 1 illustrates a bicycle 10 having a bicycle frame 12, including a steering assembly 14, a seat 16, pedals 15, and wheels 17 having wheel rims 19. The seat 16 has a seat mount 18. The bicycle 10 generally has a front 10F and a rear 10R. The steering assembly 14 comprises handlebars 20.

Installed on the bicycle 10 is a surfboard rack 30. The surfboard rack 30 comprises a pair of hooks 32 which engage the bicycle frame 12 near the front 10F and the rear 10R. More specifically, one of the hooks 32 engages the bicycle frame 12 at the steering assembly 14 beneath the handlebars 20, and the other hook 32 engages the bicycle frame 12 at the seat mount 18 under the seat 16. The purpose of the hooks 32 is to easily attach and then detach the surfboard rack 30 from the bicycle frame. A hook, in the strict sense, is well suited for this purpose, but may be replaced with a clamp or the like, at the price of reduced ease of attachment and detachment.

An adjustable bar 40 connects the hooks 32 to each other. When the hooks 32 are attached on the bicycle 10, the adjustable bar 40 extends horizontally along the frame 12 from the front 10F to the rear 10R.

A pair of cradle assemblies 50 extend from the adjustable bar 40 near each of the hooks 32. In FIG. 1, a major portion of the cradle assembly has been removed to show the braces 52 which extend downward against the bicycle frame to provide support for the surfboard rack. The braces 52 have a rubber coated portion, to prevent the braces 52 from scratching or marring the bicycle frame, especially when the surfboard rack is under full load.

Figure 4:
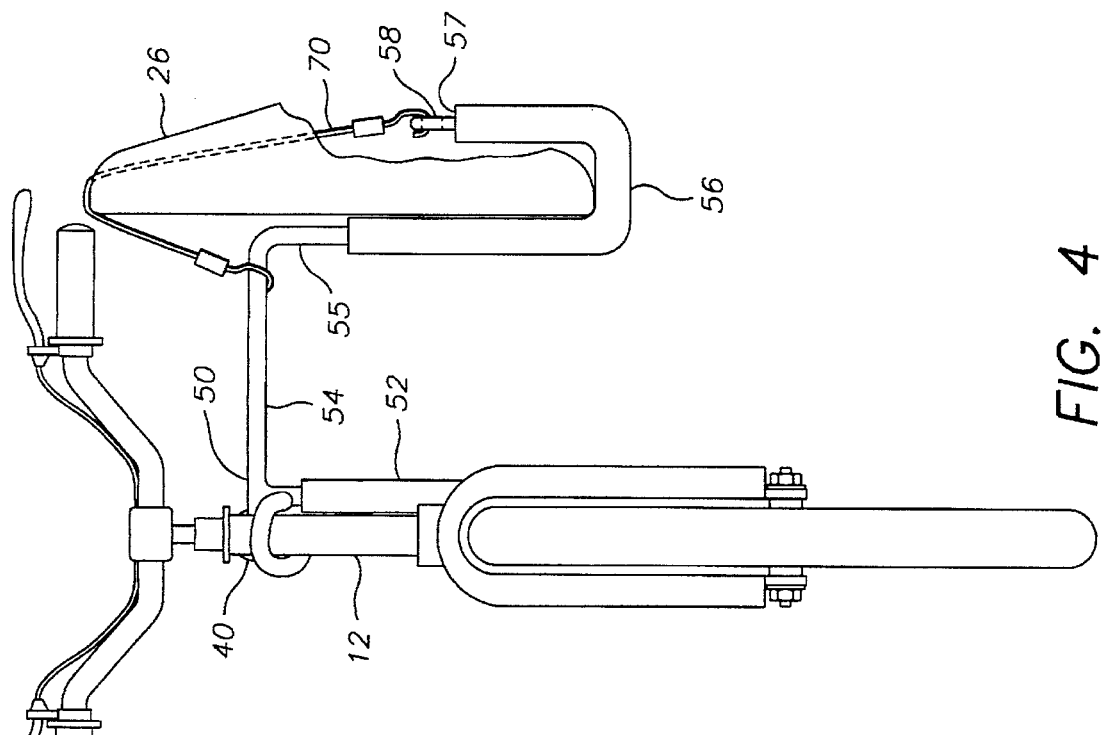
FIG. 4 is a side elevational view, with parts broken away, illustrating the surfboard held in place in the cradle assembly.

FIG. 4 is a side elevational view, in which the overall structure of one of the cradle assemblies 50 is clearly illustrated. The cradle assembly 50 has a first member 54 which extends from the adjustable bar 40 horizontally away from the bicycle frame 12 and perpendicular to the bicycle frame 12. The brace 52 extends downward from the first member 54. A second member 55 extends downward from the first member 54 opposite the adjustment bar 40. In fact, the first member and second member would usually be formed of a single tubular material, with a substantially right-angle bend separating the first member 54 and second member 55. The length of the first member 54 is selected to allow the bicycle to be steered without damaging the surfboard, and so that the second member 55 is a sufficient distance away from the bicycle frame 54 to allow a person to comfortably pedal the bicycle. In other words, the length of the first member should be at least one half the lateral distance across the hips of an average person.

A cradle 56 is attached to the second member opposite the first member 54. Once again, the cradle 56 may be formed of the same piece of material as the first member and second member, with additional bends to form the cradle 56. The cradle 56 is shaped to support a surfboard 26. The cradle 56 should be coated with rubber, to prevent the cradle 56 from scratch, marring, or otherwise damaging the surfboard 26 being carried. The cradle 56 has a cradle end 57 which is located on the cradle 56 opposite the second member 55. An eyelet 58 is present on the cradle end 57 to provide a convenient place to attach a hooked strap 70. The hooked strap 70 has two ends. The hooked strap 70 attaches on one end to the eyelet 58, and on the other end to the first member 54 or second member 55, to hold the surfboard 26 securely in the cradle 56. Preferably the hooked strap 70 includes a stretchable bungee cord or the like, which can be stretched around the surfboard 26 and then attached to the surfboard rack to securely hold the surfboard 26. Additional hooked straps 70, or other provisions can be made on the cradle assembly 50 to secure a windsurfer sail, which has effectively the same shape as the surfboard when in its storage position.

Figure 2:
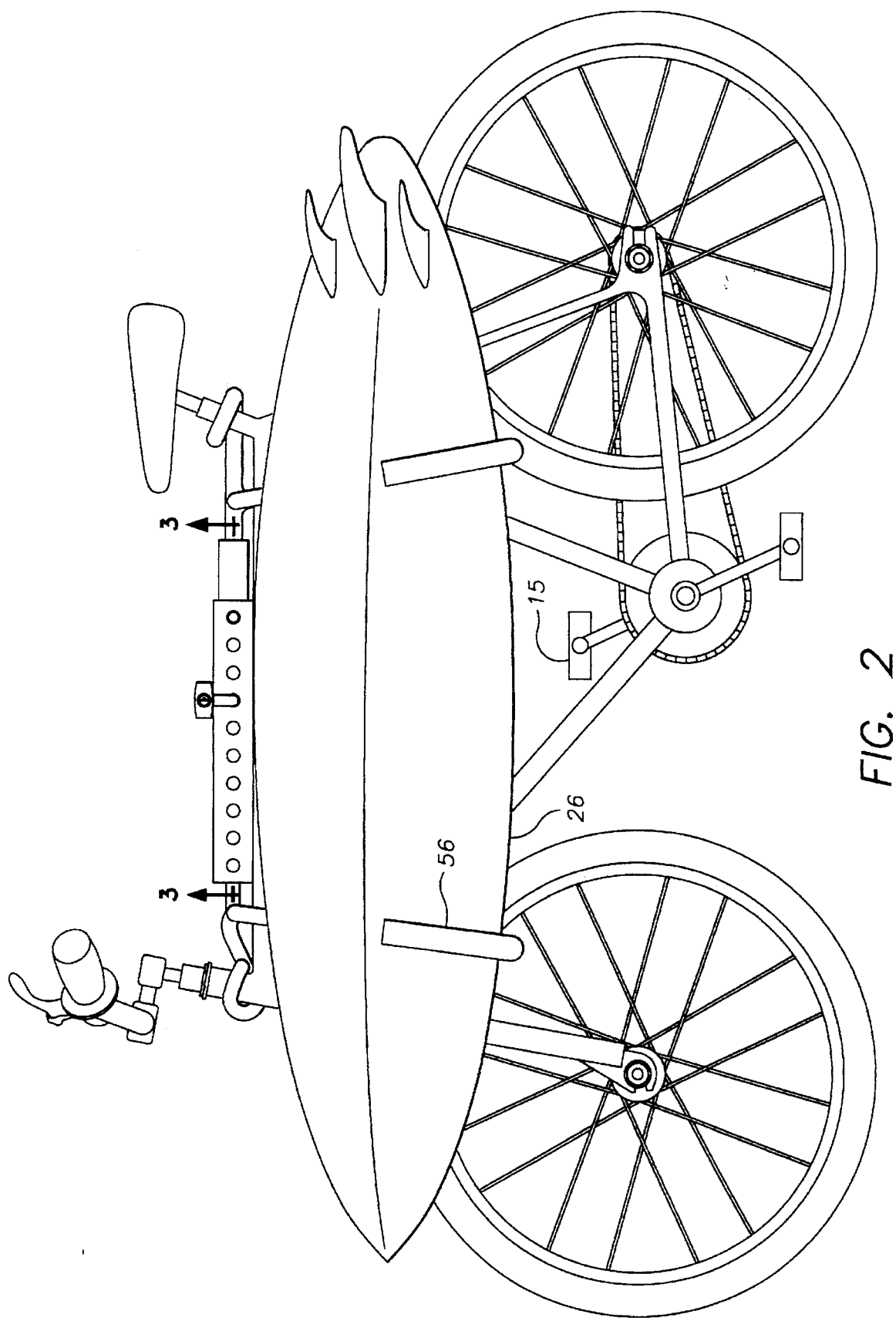
FIG. 2 is a front elevational view, similar to FIG. 1, except with the cradle assembly holding a surfboard.

Referring to FIG. 2, the cradle 56 should be positioned so that the surfboard is held above the pedals 15 when at their apex of travel. Holding the surfboard 26 above the pedals 15 is important in preventing the rider from inadvertently kicking the surfboard 26 during vigorous pedaling.

Figure 3:
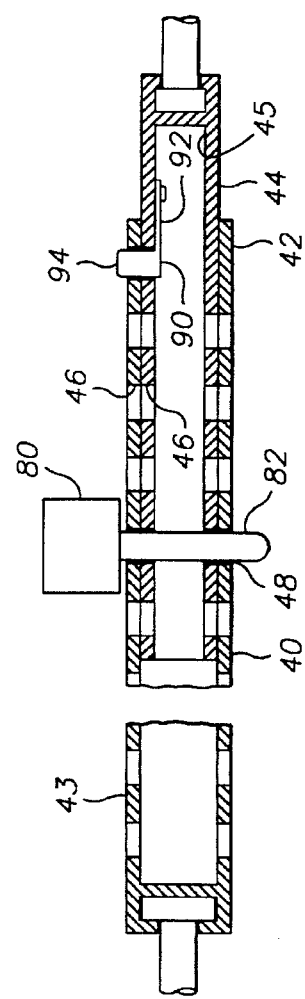
FIG. 3 is a cross sectional view, taken along line 3—3 in FIG. 2.

FIG. 3 details the construction of the adjustable bar 40. The adjustable bar 40 comprises an outer tube 42, and an inner tube 44 slidably mounted within the outer tube 42. The length of the adjustable bar 40, or the distance between the hooks 32, depends on the relative position of the inner tube 44 within the outer tube 42. The adjustable bar 40 also has an adjustable bar exterior 43 outside the outer tube 42, and an adjustable bar interior 45 within the inner tube 44.

The inner tube 44 and outer tube 42 have setting holes 46 which extend fully through the inner tube 44 and through the outer tube 42, transverse to inner tube 44 and outer tube 42. The setting holes 46 are periodically spaced on the inner tube 44 and outer tube 42. The spacing of the setting holes 46 is matched, thus the setting holes 46 may be aligned to form a continuous shaftway 48 connecting opposite walls of the outer tube exterior. A padlock 80 having a shackle 82 may be used to lock the relative position of the inner tube 44 and outer tube 46. By extending the shackle 82 through the continuous shaftway 48 formed by the matched setting holes 46, the inner tube 44 and outer tube 42 become incapable of relative motion.

With the padlock 80 removed, adjustment of the length of the adjustable bar 40 is normally regulated by a an adjustment tab 90 mounted within the adjustable bar interior 45. The adjustment tab 45 may comprise a flat spring 92 and a protrusion 94. The flat spring 92 is mounted parallel to the length of the inner tube 44 and outer tube 42. The protrusion 94 extends transverse to the flat spring 92 and thus is capable of extending through the setting holes 46. The flat spring 92 biases the protrusion 94 outward away from the adjustment bar interior 45 to give the protrusion 94 the tendency to extend through aligned, matched setting holes 46 in order to lock the relative positions of the inner tube 44 and outer tube 42. When the protrusion extends through matched setting holes 46, it extends partially outside the adjustment bar 40. Thus, the protrusion 94 functions as a user actuated adjustment button, whereby the user manually presses the protrusion 94 toward the adjustable bar interior 45 until it extends within the outer tube 42, while simultaneous pulling the inner tube 44 and outer tube 42 away or toward each other. The adjustable tube 40 will then essentially become unlocked, and will allow its length to be adjusted until the protrusion 94 becomes aligned with matched setting holes 46, and the flat spring 92 "pops" the protrusion into the holes and locks the length of the adjustment bar 40.

Figure 6:
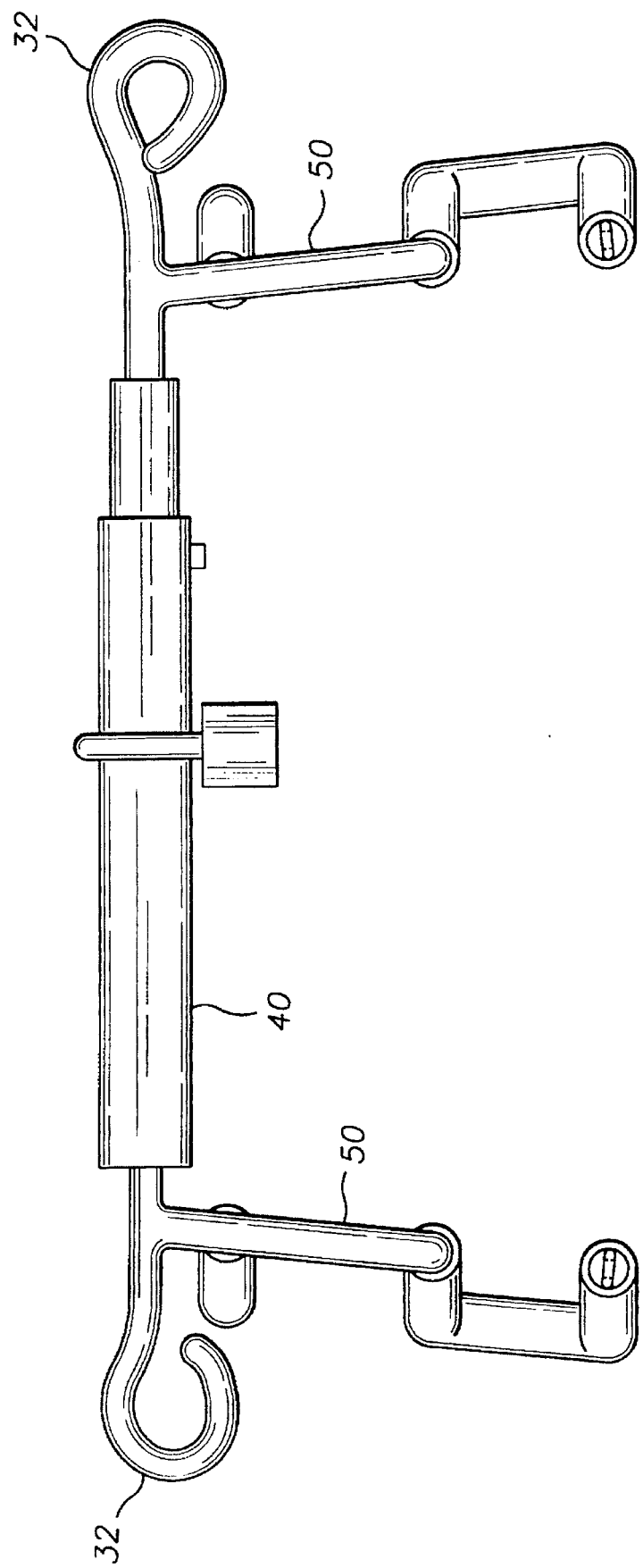

FIG. 6 is a top plan view of the surfboard rack 30 per se. As illustrated, the cradle assemblies 50 are angled outward from one another in horizontal and vertical planes. The hooks 32, as viewed from above, are semicircular, formed of a twisted piece of material which curves in vertical and horizontal planes. When viewed from certain angles, it may appear that the hooks 32 form a closed loop. However, a sufficient opening is present in each hook to allow portions of the bicycle frame to enter the hook with the hook twisting around that portion of the bicycle frame. To place the surfboard rack 30 on the bicycle frame, the surfboard rack 30 is maneuvered until the frame extends into one of the hooks 32. The other hook 32 is attached onto the frame by adjusting the length of the adjustable bar 40 until the hook overshoots its target at the opposite end of the frame, and then the adjustable bar 40 is shortened to hook onto the frame.

Figure 5:
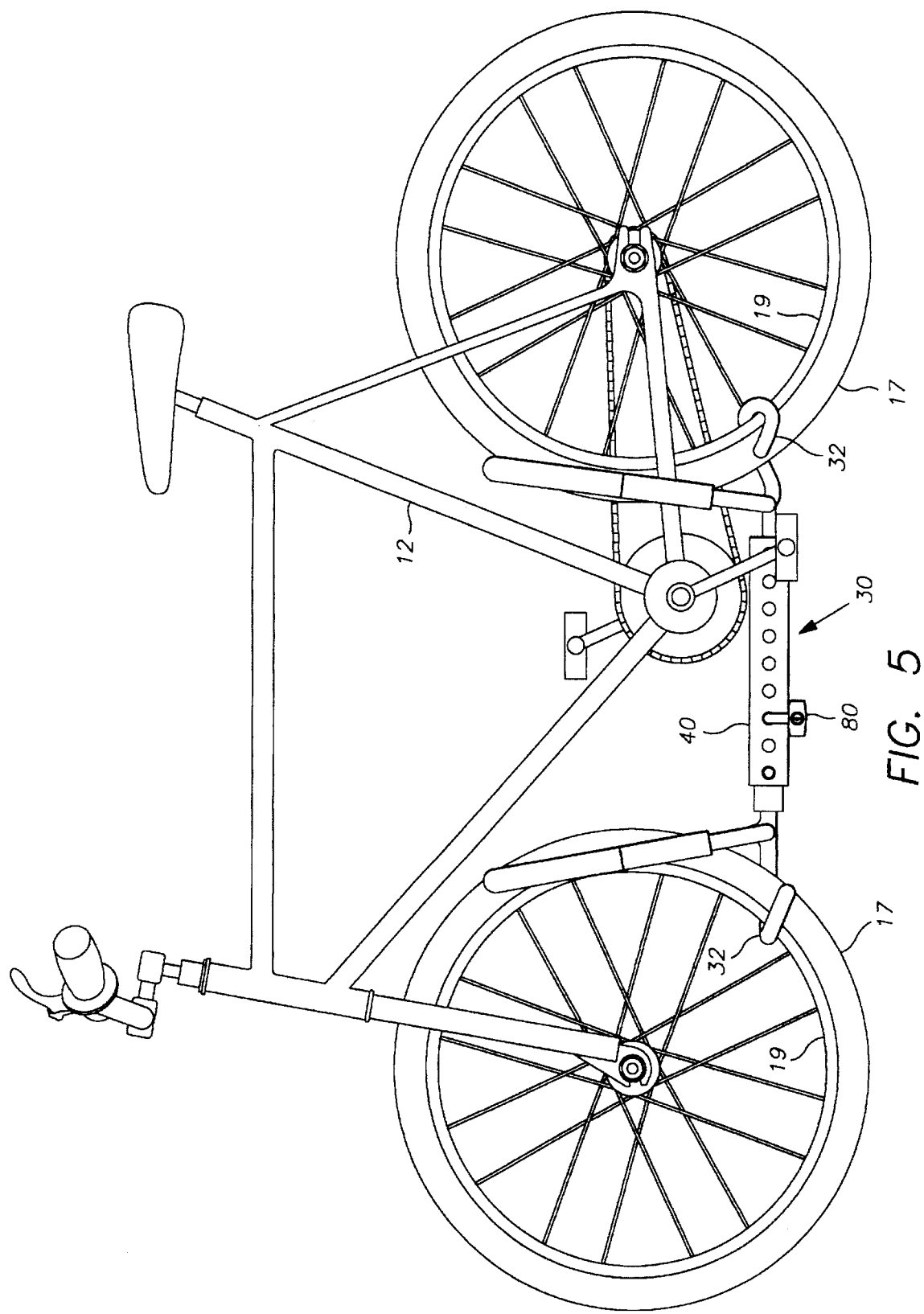
FIG. 5 is a front elevational view, illustrating a further use for the invention, wherein it has been removed from the bicycle frame, locked, and now functions as an anti-theft device.

FIG. 5 shows a further use for the surfboard rack 30. The surfboard rack 30 has been removed from its normal mounted position on the bicycle frame 12. Now, the hooks are each attached around one of the wheel rims 19 of the wheels 17. The length of the adjustable bar 40 has been set so that the hooks are taut against the wheel rims 19, and the padlock 80 is used to fix the length of the adjustable bar 40. Since with the hooks 32 around the wheel rims 19 the bicycle cannot be operated, the surfboard rack 30 now serves the additional purpose of being an anti-theft device.

In conclusion, herein is presented a surfboard rack 30 which is mounted on a bicycle to easily transport a surfboard, and which may also function as a bicycle anti-theft device.

What is claimed is:

1. A surfboard rack, for holding a surfboard and attaching onto a bicycle having a bicycle frame, a steering assembly having handlebars, wheels, pedals, and a seat having a seat support, comprising:

a front hook, for engaging the bicycle frame near the steering assembly;

a rear hook, for engaging the bicycle frame near the seat; and an adjustable bar extending between the front hook and rear hook, the bar is adjustable to vary the distance between the front hook and rear hook; and a pair of cradle assemblies attached to the adjustable bar, one of the cradle assemblies attached near the front hook, and the other cradle assembly attached near the rear hook, the cradle assemblies capable of supporting a surfboard alongside the bicycle, the surfboard extending horizontally between the cradle assemblies.

2. The surfboard rack as recited in claim 1, further comprising a pair of braces, each brace attached to one of the cradle assemblies, the braces extending downward to support the weight of the surfboard in the cradle assembly and to resist the tendency of the cradle assemblies to torque inward toward the bicycle frame under the weight of the surfboard.

3. The surfboard rack as recited in claim 2, wherein each cradle assembly has a first member which extends horizontally away from the attachment bar and perpendicular to the bicycle frame, a second member attached to the first member which extends downward from the first member and parallel to the bicycle frame, and a cradle attached to the second member for supporting the surfboard.

4. The surfboard rack as recited in claim 3, wherein the adjustment bar further comprises an outer tube and an inner tube within the outer tube, the outer tube and inner tube having matching setting holes extending through the outer tube and through the inner tube transverse to the outer tube and inner tube, the inner tube capable of moving within the outer tube to various positions when at least one of the setting holes on the inner tube is aligned with at least one of the setting holes in the outer tube so that an object can be inserted through both holes to fix the relative position of the inner tube and outer tube and to fix the length of the adjustment bar.

5. The surfboard rack as recited in claim 4, wherein the adjustment bar further comprises an adjustment bar interior and an adjustment tab having a flat spring and a protrusion extending from the flat spring, the protrusion extending fully through the matched setting holes to lock the relative positions of the inner and outer tubes, the protrusion may be manually pushed in toward the adjustment bar interior to allow the inner and outer tubes relative motion, the flat spring biasing the protrusion outward away from the adjustment bar interior to give the protrusion the tendency to extend through matched setting holes when they are aligned in order to lock the relative positions of the inner tube and outer tube.

6. The surfboard rack as recited in claim 3, wherein the cradle has a cradle end, the cradle end having an eyelet, and the apparatus further comprises hooked straps, the hooked straps extending from the eyelet, over the surfboard, and hooking onto one of the first member and the second member.

7. The surfboard rack as recited in claim 3, wherein the first member is selected so that it is approximately one half the lateral distance between the hips of an average person, so that it allows the person to pedal the bicycle.

8. The surfboard rack as recited in claim 7, wherein the cradles are positioned so that the surfboard is held above the pedals at their apex of travel.

* * * * *